United States Patent [19]
Miyamoto

[11] Patent Number: 6,070,804
[45] Date of Patent: Jun. 6, 2000

[54] NON-CONTACT IC CARD WITH MONITOR FOR SOURCE POWER

[75] Inventor: Taiyuu Miyamoto, Hyogo, Japan

[73] Assignees: Mitsubishi Denki Kabushiki Kaisha, Tokyo; Mitsubishi Electric System LSI Design Corporation, Hyogo, both of Japan

[21] Appl. No.: 09/030,079

[22] Filed: Feb. 25, 1998

[30] Foreign Application Priority Data

Aug. 12, 1997 [JP] Japan ................................. P9-217386

[51] Int. Cl.[7] ................................................... G06K 19/06
[52] U.S. Cl. .......................... 235/494; 235/492; 235/488; 365/229; 365/228; 340/825.34; 340/825.31
[58] Field of Search ..................................... 235/492, 488, 235/382, 382.5, 384; 365/229, 228; 340/825.34, 825.31, 825.03

[56] References Cited

U.S. PATENT DOCUMENTS

| | | | |
|---|---|---|---|
| 3,859,638 | 1/1975 | Hume, Jr. ............................ | 340/173 R |
| 4,399,524 | 8/1983 | Muguruma et al. ..................... | 365/229 |
| 4,422,163 | 12/1983 | Oldenkamp ............................ | 365/229 |
| 4,463,270 | 7/1984 | Gordon ................................. | 307/296 |
| 4,777,626 | 10/1988 | Matsushita et al. .................... | 365/226 |
| 4,855,994 | 8/1989 | Takeuchi et al. ........................ | 370/69 |
| 4,962,485 | 10/1990 | Kato et al. ............................. | 365/299 |
| 5,382,778 | 1/1995 | Takahira et al. ........................ | 235/380 |
| 5,604,342 | 2/1997 | Fujioka ................................. | 235/435 |
| 5,698,836 | 12/1997 | Fujioka ................................. | 235/492 |
| 5,703,573 | 12/1997 | Fujimoto et al. ................. | 340/825.54 |
| 5,801,372 | 9/1998 | Yamaguchi ............................. | 235/492 |
| 5,831,547 | 11/1998 | Ohtsuki et al. .................... | 340/825.54 |

FOREIGN PATENT DOCUMENTS

| | | |
|---|---|---|
| 57-191899 | 11/1982 | Japan . |
| 61-178548 | 11/1986 | Japan . |
| 62-154082 | 7/1987 | Japan . |
| 404030282 | 2/1992 | Japan ............................. G06K 17/00 |
| 404039790 | 2/1992 | Japan ............................. G06K 17/00 |
| 405101229 | 4/1993 | Japan ............................. G06K 17/00 |
| 405143788 | 6/1993 | Japan ............................. G06K 17/00 |

*Primary Examiner*—Donald Hajec
*Assistant Examiner*—Daniel S. Felten
*Attorney, Agent, or Firm*—Leydig, Voit & Mayer

[57] ABSTRACT

A non-contact type IC card includes a rectifier circuit for supplying a source voltage to respective circuits of an IC card based on the strength of radio waves received from a host computer. A reference voltage generating circuit generates a reference voltage. A comparison circuit compares the source voltage with the reference voltage. A control circuit prohibits the writing of data if the source voltage becomes less than the reference voltage.

4 Claims, 8 Drawing Sheets

NON-CONTACT IC CARD WITH MONITOR FOR SOURCE POWER

BACKGROUND OF THE INVENTION

1. Field of the Invention

The present invention relates to non-contact type IC cards that transfer data to and from a host system apparatus such as an information processing equipment through non-contact media such as radio waves and the like.

2. Description of the Related Art

Among IC cards that transfer data to and from host system apparatus through non-contact media such as radio waves, a non-contact type IC card illustrated in the block diagram of FIG. 8 is known. Referring to FIG. 8, a non-contact type IC card 100, hereinafter referred to as IC card simply, has a transmitting-and-receiving antenna 102, hereinafter referred to as antenna simply, that transmits radio waves to a host system apparatus 101 and receives radio waves from host system apparatus 101, a modulating circuit 103 that modulates data to be transmitted through antenna 102, a demodulating circuit 104 that demodulates the data received through antenna 102, a UART 105 that converts serial data into parallel data and converts parallel data into serial data, and a memory section 106 that is formed of EEPROM.

IC card 100 further has a control circuit 107 that controls memory section 106, a rectifier circuit 108 that rectifies a radio wave received through antenna 102 to output the rectified power, a regulator circuit 109 that makes constant the voltage of the power output from rectifier circuit 108, to supply the regulated power to each section. The connection between regulator circuit 109 and each section is omitted from FIG. 8.

Host system apparatus 101 comprises a host computer 111 and a data reader-writer 112, hereafter referred to as reader-writer. Reader-writer 112 has a transmitting-receiving antenna 113, hereinafter referred to as antenna, that transmits radio waves to IC card 100 and receives radio waves from IC card 100, a modulating-demodulating circuit 114 that modulates and demodulates data, and a control section that controls modulating-demodulating circuit 114 based on instructions of host computer 111.

In the above construction, the control section 115 of reader-writer 112 controls modulating-demodulating circuit 114 based on instructions of host computer 111 and transfers data through antenna 113. In the case where IC card 100 receives data transmitted from reader-writer 112, the data transmitted from reader-writer 112 is received by antenna 102 and then A/D converted and demodulated into a digital signal by demodulating circuit 104. The demodulated data is serial data. UART 105 converts the serial data into parallel data to output into control circuit 107. Control circuit 107 executes various procedures based on the commands input in this way.

In the case where IC card 100 transmits data stored in memory section 106 to reader-writer 112, control circuit 107 reads the data out from memory section 106 to output into UART 105. UART 105 converts the input parallel data into serial data. The converted serial data is modulated by modulating circuit 103 to be transmitted through antenna 102.

However, the intensity of the electric field strength of a radio waves received by IC card 100 changes depending on the distance between IC card 100 and reader-writer 112, so that the source voltage from rectifier circuit 108 changes. Therefore, the source voltage from rectifier circuit 108 declines, and regulator circuit 109 cannot keep its output voltage constant. As a result, the source voltage supplied to each section declines, and the operation of each section becomes unstable.

Further, in the case where data is written into memory section 106 or the data stored in memory section 106 is deleted, a source voltage greater than a predetermined value is necessary. However, if the source voltage supplied from regulator circuit 109 declines, the writing of data into memory section 106 is not correctly performed, so that the data stored in memory section 106 may be destroyed.

Incidentally, Japanese Pat. Kokai SHO62-154082 disclosed an IC card that is electrically connected to a reader-writer with contact terminals and that has a voltage annunciator that prohibits the writing of data into memory if the source voltage becomes less than a predetermined value. Also, Japanese Utility-Model Kokai SHO61-178548 discloses document-preparation apparatus such as a personal word processor for the Japanese language such that the battery voltage is tested before the writing of data into a floppy disk and the writing is prohibited if the voltage is less than a predetermined value.

SUMMARY OF THE INVENTION

The present invention has been therefore devised to solve the above problem. Its object is to obtain a non-contact type IC card that can prevent the writing of data from becoming incomplete caused by changes in the electric field strength of the received radio waves, to improve the reliability of the writing.

In order to achieve these objects of the present invention, there is provided a non-contact type IC card that transfers data to and from a host system apparatus through non-contact media such as radio waves and the like comprises an interface section that interfaces with the host system apparatus, a memory section that stores data, a control circuit that controls the operation of the memory section, following the commands input from the host system apparatus through the interface section, a rectifier circuit that rectifies a radio wave received by the interface section, to supply the rectified power to each section as a power supply, a reference-voltage generating circuit that generates and outputs a predetermined reference voltage, and a comparison circuit that compares the source voltage from the rectifier circuit with the reference voltage from the reference-voltage generating circuit, to output the comparison result into the control circuit. The control circuit prohibits the writing of data into the memory section and transmits a signal that indicates the writing of data into the memory section is impossible, into the host system apparatus through the interface section, if the comparison result indicates that the source voltage is less than the reference voltage.

In this construction, the IC card monitors changes in the source voltage supplied from the rectifier circuit, due to changes in the electric field strength of the received radio wave. The IC card prohibits the writing of data into the memory section and transmits a signal that indicates the writing of data into the memory section is impossible, into the host system apparatus, if the source voltage becomes less than the reference voltage. Accordingly, the reliability of the writing of data can be improved.

Preferably, the above control circuit may have one or more error flags to be set when the source voltage is less than the reference voltage. In this case, when one error flag is set, the control circuit prohibits the writing of data into the memory section and transmits a signal that indicates the writing of data into the memory section is impossible, into the host system apparatus through the interface section.

Further, the above error flag may be formed of a first error flag that is set when the source voltage becomes less than the reference voltage before the writing of data and a second error flag that is set when the source voltage becomes less than the reference voltage during the writing of data. In this case, when the first error flag is set, the control circuit prohibits the writing of data into the memory section and transmits a signal that indicates the writing of data into the memory section is impossible, into the host system apparatus through the interface section. When the second error flag is set, the control circuit prohibits the writing of data into the memory section and transmits a signal that indicates the writing of data into the memory section has been incomplete, into the host system apparatus through the interface section. By these means, the IC card can distinguish an error before the processing of writing from an error during the processing of writing, so that the host system apparatus can judge whether the data in the memory is in its original state or has been altered.

The above rectifier circuit may have a capacitor at its output. In this case, the control circuit does not prohibit the writing of data into the memory section, when the source voltage becomes less than the reference voltage during the writing. That is, if a radio wave from the outside becomes weak during the writing of data, then the IC card can complete the writing of the data by preventing the decline of the source voltage supplied to each section until the completion of the writing. Consequently, the writing of data is secured, and the reliability of the writing of data is improved.

According to another aspect of the present invention, a non-contact type IC card in accordance with the present invention comprises an interface section that interfaces with a host system apparatus, a memory section that stores data, a control circuit that controls the operation of the memory section, following the commands input from the host system apparatus through the interface section, a rectifier circuit that rectifies a radio wave received by the interface section to output the rectified power, a regulator circuit that keeps constant the source voltage of the power output from the rectifier circuit, to supply the regulated power to each section, a reference-current generating circuit that generates and outputs a predetermined reference current, and a comparison circuit that compares the source current from the regulator circuit with the reference current from the reference-current generating circuit, to output the comparison result into the control circuit. Here, the control circuit prohibits the writing of data into the memory section and transmits a signal that indicates the writing of data into the memory section is impossible, into the host system apparatus through the interface section, if the comparison result indicates that the source current is less than the reference current.

Further, the above control circuit may have error flags to be set when the source current is less than the reference current. In this case, when at least one error flag is set, the control circuit prohibits the writing of data into the memory section and transmits a signal that indicates the writing of data into the memory section is impossible, into the host system apparatus through the interface section.

In the case where the IC card has a regulator circuit that keeps constant the source voltage of the power output from the rectifier circuit, the IC card can also prevent the writing of data from becoming incomplete due to changes in the electric field strength of the received radio wave. Consequently, the reliability of the writing of data can be improved.

BRIEF DESCRIPTION OF THE DRAWINGS

These and other objects and features of the present invention will become clear from the following description taken in conjunction with the accompanying drawings throughout which like parts are designated by like reference numerals, and in which.

DETAILED DESCRIPTION OF THE PREFERRED EMBODIMENTS

The preferred embodiments according to the present invention will be described below in conjunction with the attached drawings.

FIRST EMBODIMENT.

Figure 1:
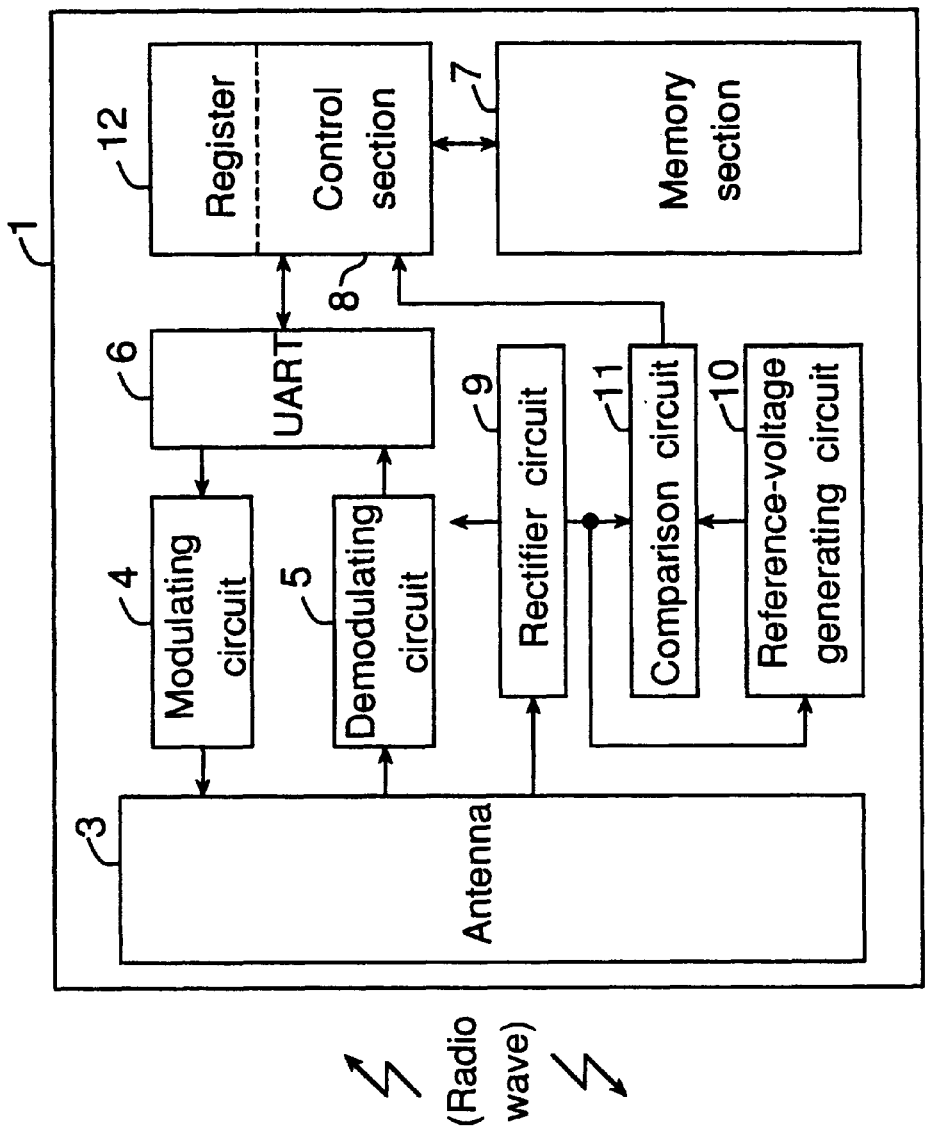
FIG. 1 is a block diagram illustrating a non-contact type IC card in a first embodiment of the present invention.

Referring to FIG. 1, a non-contact type IC card 1 has a transmitting-and-receiving antenna 3 that transmits radio waves to a host system apparatus 2 and receives radio waves from host system apparatus 2, a modulating circuit 4 that modulates data to be transmitted through antenna 3, a demodulating circuit 5 that demodulates the data received through antenna 3, a UART 6 that converts serial data into parallel data and converts parallel data into serial data, and a memory section 7 that is formed of EEPROM.

IC card 1 further has a control circuit 8 that controls memory section 7, a rectifier circuit 9 that rectifies a radio wave received by antenna 3, to supply the rectified power to each section as a power supply, a reference-voltage generating circuit 10 that generates and outputs a predetermined reference voltage, and a comparison circuit 11 that compares the source voltage from rectifier circuit 9 with the reference voltage from the reference-voltage generating circuit 10, to output a binary signal as the comparison result. Control circuit 8 has a register 12, in which error flags are set depending on the signal output from comparison circuit 11.

Antenna 3 is connected to modulating circuit 4, demodulating circuit 5, and rectifier circuit 9. Modulating circuit 4 and demodulating circuit 5 are connected to UART 6. Further, UART 6 is connected to control circuit 8. Control circuit 8 is connected to memory section 7. Rectifier circuit 9 is connected to reference-voltage generating circuit 10 and comparison circuit 11. Reference-voltage generating circuit 10 is connected to comparison circuit 11. Comparison circuit 11 is connected to control circuit 8. Still further, rectifier circuit 9 is connected to modulating circuit 4, demodulating circuit 5, UART 6, memory section 7, and control circuit 8, but the connections are omitted from FIG. 1. Here, antenna 3, modulating circuit 4, demodulating circuit 5, and UART 6 form an interface section.

On the other hand, host system apparatus 2 comprises a host computer 15 and a data reader-writer 16. Reader-writer 16 has a transmitting-receiving antenna 17 that transmits radio waves to IC card 1 and receives radio waves from IC card 1, a modulating-demodulating circuit 18 that modulates and demodulates data, and a control section 19 that controls modulating-demodulating circuit 18 based on instructions of host computer 15. Host computer 15 is connected to the control section 19 of reader-writer 16. Control section 19 is connected to modulating-demodulating circuit 18. Modulating-demodulating circuit 18 is connected to antenna 17.

In the above construction, host system apparatus 2 normally transmits a radio wave through reader-writer 16. Antenna 3 receives the radio wave from reader-writer 16 and converts the received radio wave into an electric signal to output into demodulating circuit 5 and rectifier circuit 9. Rectifier circuit 9 rectifies the input electric signal to output the rectified power into each section as a power supply. When not transmitting a radio wave to IC card 1, reader-writer 16 transmits a non-modulated radio wave. When transmitting data, reader-writer transmits a radio wave containing the data and obtained by modulating the data with the carrier wave.

The control section 19 of reader-writer 16 controls modulating-demodulating circuit 18 based on instructions from host computer 15 and transfers data through antenna 17. In the case where IC card 1 receives data transmitted from reader-writer 16, the data transmitted from reader-writer 16 is received by antenna 3 and then A/D converted and demodulated into a digital signal by demodulating circuit 5. The demodulated data is serial data. UART 6 converts the serial data into parallel data to output into control circuit 8. Control circuit 8 executes various procedures based on the commands input in this way.

In the case where IC card 1 transmits data stored in memory section 7 to reader-writer 16, control circuit 8 reads the data out from memory section 7 to output into UART 6. UART 6 converts the input parallel data into serial data. The converted serial data is modulated by modulating circuit 4 to be transmitted through antenna 3.

Figure 2:
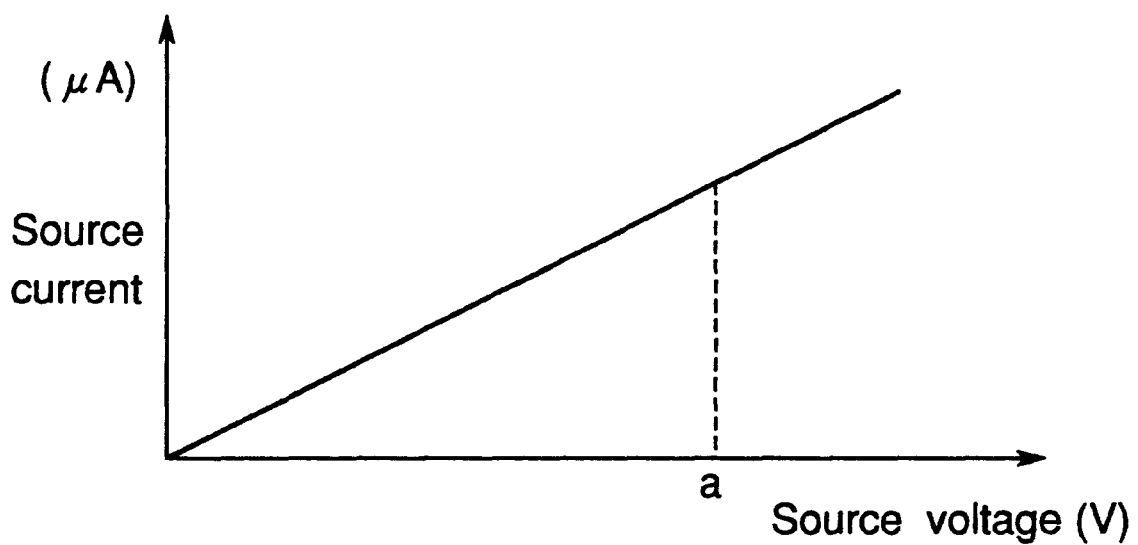
FIG. 2 is a graph illustrating the relationship between the source voltage and the source current output from the rectifier circuit in FIG. 1.

Here, reference-voltage generating circuit 10 has a voltage stabilizer that operates on the voltage input from rectifier circuit 9. Reference-voltage circuit 10 generates a predetermined reference voltage a by means of the voltage stabilizer to output into comparison circuit 11. Comparison circuit 11 compares the source voltage input from rectifier circuit 9 with the reference voltage a input from reference-voltage generating circuit 10, to output a binary judgment signal into control circuit 8, depending on the comparison result. FIG. 2 is a graph illustrating the relationship between the source voltage and the source current output from rectifier circuit 9. As seen from FIG. 2, the source voltage is proportional to the source current. The reference voltage is set at a minimum source voltage value by which the writing of data into memory section 7 and the deleting of data can be securely executed.

Control circuit 8 sets the error flags stored in register 12, depending on the judgment signal input from comparison circuit 11. Register 12 stores a first error flag F1 and a second error flag F2. The first error flag F1 indicates the result of the judgment signal when the writing of data is not performed. The second error flag F2 indicates the result of the judgment signal when the writing of data is performed. Control circuit 8 sets the first error flag F1 based on the judgment signal input from comparison circuit 11 when the writing of data is not performed. Control circuit 8 sets the second error flag F2 based on the judgment signal that is input from comparison circuit 11 when the writing of data is performed.

For example, comparison circuit 11 outputs a judgment signal of LOW level into control circuit 8, if the source voltage input from rectifier circuit 9 is equal to or greater than the reference voltage a. Control circuit 8 then resets both the first and second error flags F1, F2 stored in register 12. Control circuit 8 does not prohibit the writing of data into memory section 7 and performs predetermined processing following the commands input from host system apparatus 2, when both the first and second error flags F1, F2 are reset.

On the other hand, comparison circuit 11 outputs a judgment signal of HIGH level into control circuit 8, if the source voltage input from rectifier circuit 9 is less than the reference voltage a. Control circuit 8 then sets the first error flag F1 stored in register 12, if the writing of data is not being performed. Control circuit 8 sets the second error flag F2 stored in register 12, if the writing of data is being performed. When either one of the first and second error flags F1, F2 is set, then control circuit 8 prohibits the writing of data into memory section 7 and transmits a signal that indicates the writing of data is impossible, into host system apparatus 2 through UART 6, modulating circuit 4, and antenna 3. When the second error flag is set, in addition to the signal that indicates the writing of data is impossible, control circuit 8 may transmit a signal that indicates the writing of data has been incomplete, into host system apparatus 2.

In this way, control circuit 8 judges whether the writing of data into memory section 7 can be normally performed or not, based on the judgment signal input from comparison circuit 11. If judging that the writing of data cannot be normally performed, then control circuit 8 prohibits the writing of data into memory section 7 and informs host system apparatus 2 of the fact that the writing of data is impossible.

Figure 3:
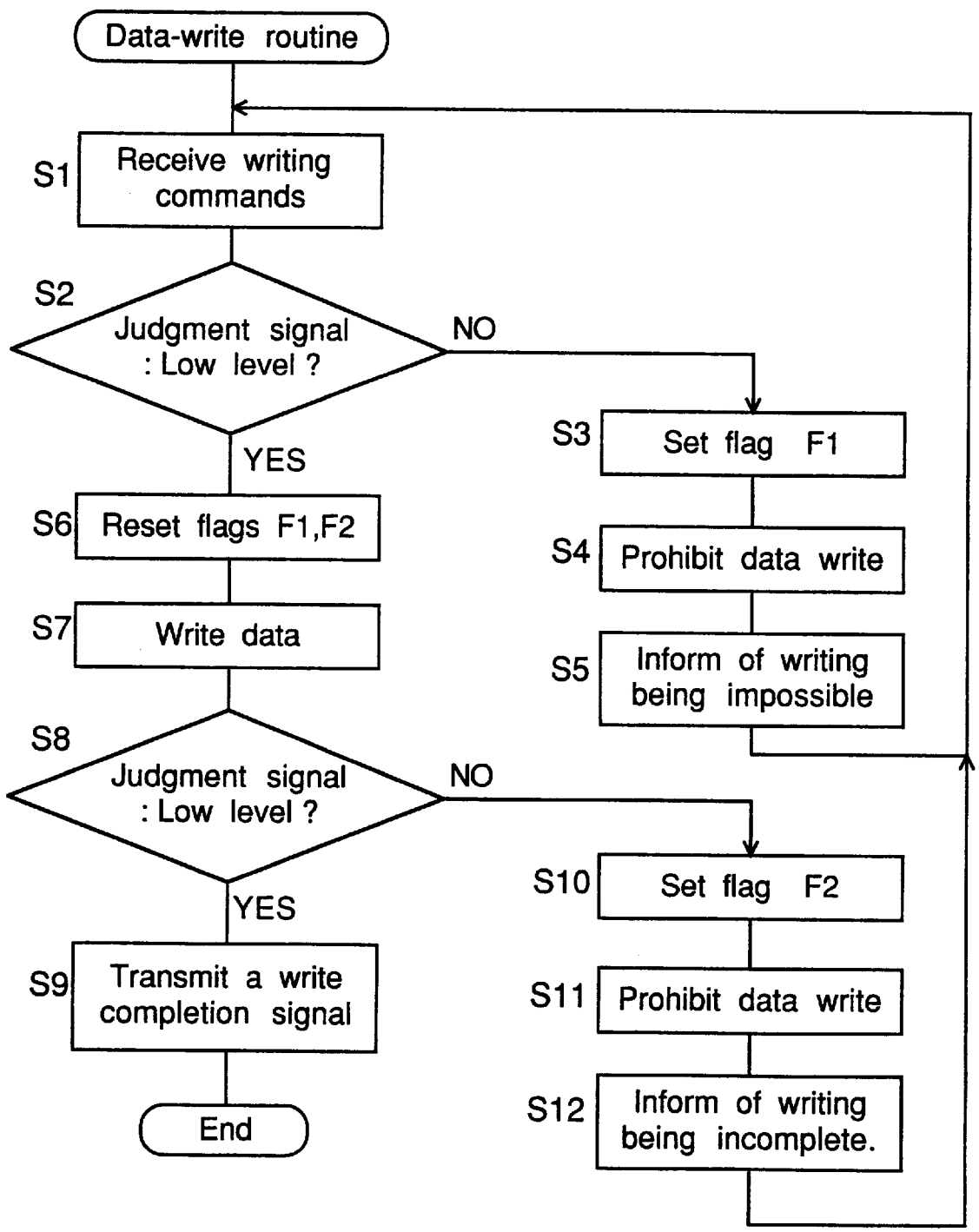
FIG. 3 is a flowchart illustrating the operation of the IC card in FIG. 1 during the writing of data.

FIG. 3 is a flowchart illustrating the operation of IC card 1 during the writing of data. The operation against changes in the electric field strength of the radio wave received by IC card 1 is described in the following in conjunction with FIG. 3.

Referring to FIG. 3, in the first step S1, antenna 3 receives a write command transmitted from host system apparatus 2, and control circuit 8 obtains the write command through demodulating circuit 5 and UART 6. Next, in step S2, control circuit 8 tests whether the judgment signal from comparison circuit 11 is at LOW level or not. If the judgment signal is at HIGH level (NO), then control circuit 8 proceeds with step S3.

In step S3, control circuit 8 sets the first error flag F1 of register 12. In step S4, control circuit 8 prohibits the writing of data. In step S5, control circuit 8 transmits a signal that indicates the writing of data is impossible, into host system apparatus 2 through modulating circuit 4 and antenna 3, and returns to step S1. If the judgment signal is at LOW level in step S2 (YES), then control circuit 8 proceeds with step S6. In step S6, control circuit 8 resets both the first and second error flags F1, F2. In step S7, control section 8 makes memory section 7 execute the operation of writing data.

In step S8, control circuit 8 again tests whether the judgment signal from comparison circuit 11 is at LOW level or not. If the judgment signal is at LOW level (YES), then in step S9, control circuit 8 transmits a signal that the writing of data has been completed, into host system apparatus 2 through UART 6, modulating circuit 4, and antenna 3. Then the present flow terminates.

If the judgment signal from comparison circuit 11 at HIGH level in step S8 (NO), then control circuit 8 sets the second error flag F2 in step S10. Control circuit 8 then prohibits the writing of data in step S11. In step S12, control circuit 8 transmits a signal that indicates the writing of data has been incomplete, into host system apparatus 2 through UART 6, modulating circuit 4, and antenna 3, and returns to step S1.

As described above, the non-contact type IC card of the first embodiment in accordance with the present invention monitors changes in the source voltage output from rectifier circuit 9, due to changes in the electric field strength of the received radio wave. The IC card prohibits the writing of data into memory section 7 and transmits a signal that indicates the writing of data is impossible, into host system apparatus 2, if the source voltage becomes less than the reference voltage a. Consequently, the IC card can prevent the writing of data from becoming incomplete caused by changes in the electric field strength of the received radio wave, so that the reliability of the writing of data can be improved.

SECOND EMBODIMENT.

In the first embodiment described above, the voltage of the power output from the rectifier circuit 9 has been supplied to each section as source voltage. In a second embodiment described in the following, the voltage of the power output from the rectifier circuit 9 is regulated so as not to exceed a constant value and supplied to each section as source voltage.

Figure 4:
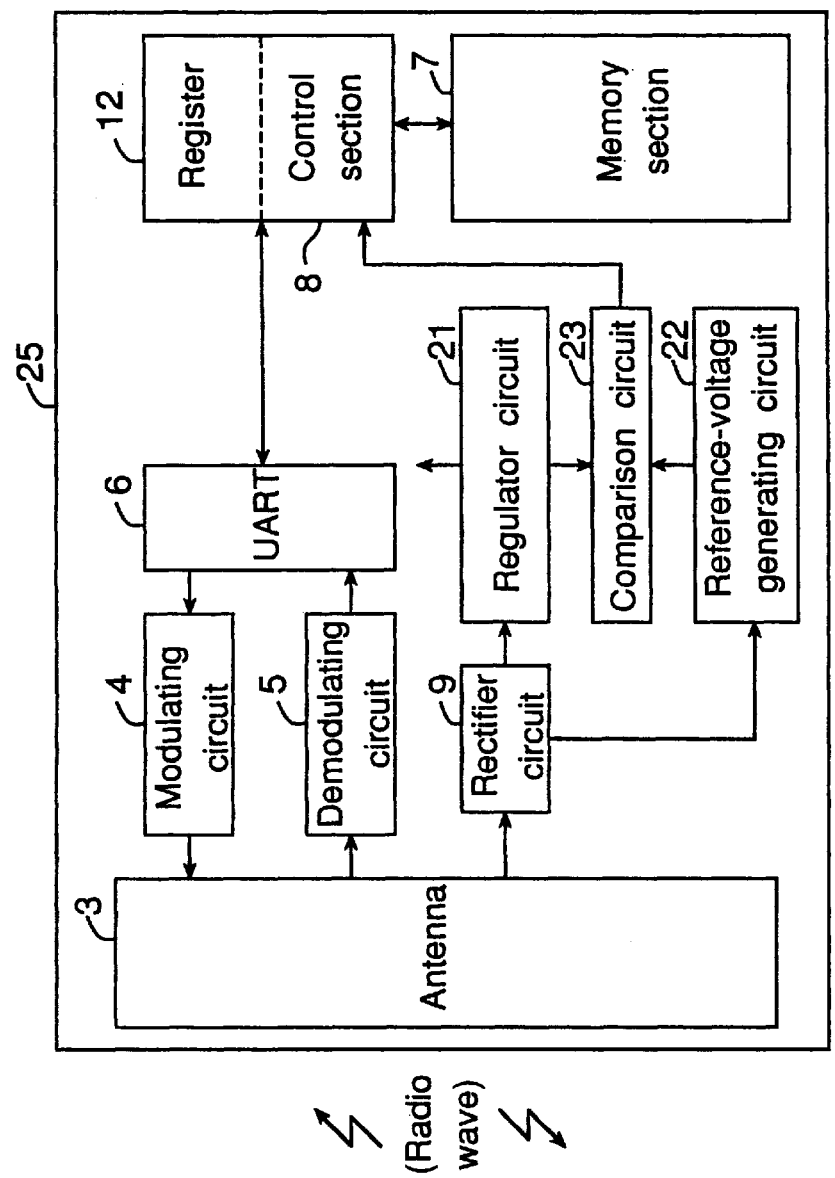
FIG. 4 is a block diagram illustrating a non-contact type IC card in a second embodiment.
Figure 4:
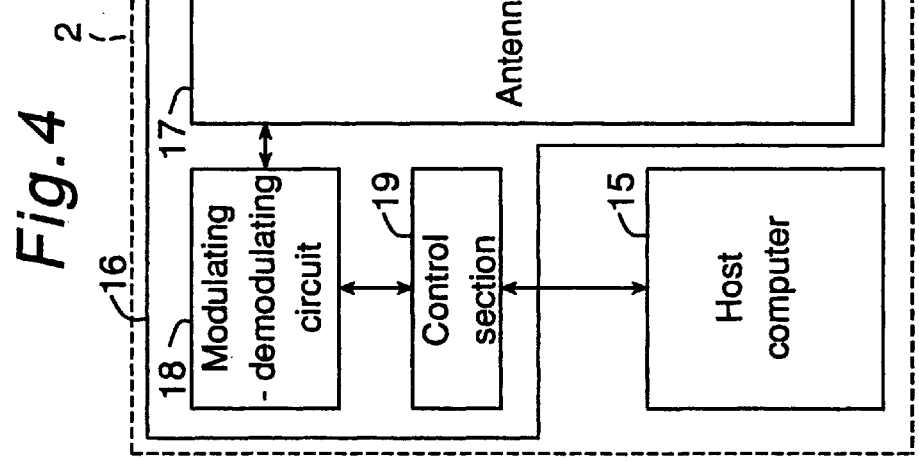

FIG. 4 is a block diagram illustrating a non-contact type IC card in the second embodiment. FIG. 4 differs from FIG. 1 in that the IC card has additionally a regulator circuit 21 that keeps constant the voltage of the power output from rectifier circuit 9, to supply the regulated power to each section. Further, the reference-voltage generating circuit 10 is replaced with a reference-current generating circuit 22. The comparison circuit 11 is altered into a comparison circuit 23 that compares the source current input from regulator circuit 21 with the reference current input from reference-current generating circuit 22. With these alterations, the IC card 1 in FIG. 1 is changed into an IC card 25.

Referring to FIG. 4, IC card 25 has a transmitting-and-receiving antenna 3, a modulating circuit 4, a demodulating circuit 5, a UART 6, and a memory section 7. IC card 25 further has a control circuit 8, a rectifier circuit 9, a regulator circuit 21, a reference-current generating circuit 22, and a comparison circuit 23. Regulator circuit 21 keeps constant the voltage of the power output from rectifier circuit 9, to supply the regulated power to each section. Reference-current-generating circuit 22 generates and outputs a predetermined reference current b. Comparison circuit 23 compares the source current output from regulator circuit 21 with the reference current b, to output the comparison result as a binary signal. Control circuit 8 has a register 12. Register 12 has flags that are set depending on the signal output from comparison circuit 23.

Rectifier circuit 9 is connected to regulator circuit 21 and reference-current generating circuit 22. Reference-current generating circuit 22 is connected to comparison circuit 23. Comparison circuit 23 is connected to regulator circuit 21 as well as to control circuit 8. Further, regulator circuit 21 is connected to modulating circuit 4, demodulating circuit 5, UART 6, memory section 7, and control circuit 8, but the connections are omitted from FIG. 4.

In the above construction, host system apparatus 2 normally transmits a radio wave through reader-writer 16. Antenna 3 receives the radio wave from reader-writer 16 and converts the received radio wave into an electric signal to output into modulating circuit 5 and rectifier circuit 9. Rectifier circuit 9 rectifies the input electric signal. Regulator circuit 21 keeps at a predetermined constant value the voltage of the rectified power output from rectifier circuit 9, to supply the regulated power into each section.

Here, reference-current generating circuit 22 has a current stabilizer that operates on the voltage of the power input from rectifier circuit 9 and generates a predetermined reference current b to output the generated reference current b into comparison circuit 23. Comparison circuit 23 compares the current of the power output from regulator circuit 21 with the reference current b input from reference-current generator 22, to output a binary signal into control circuit 8, depending on the comparison result.

Figure 5:
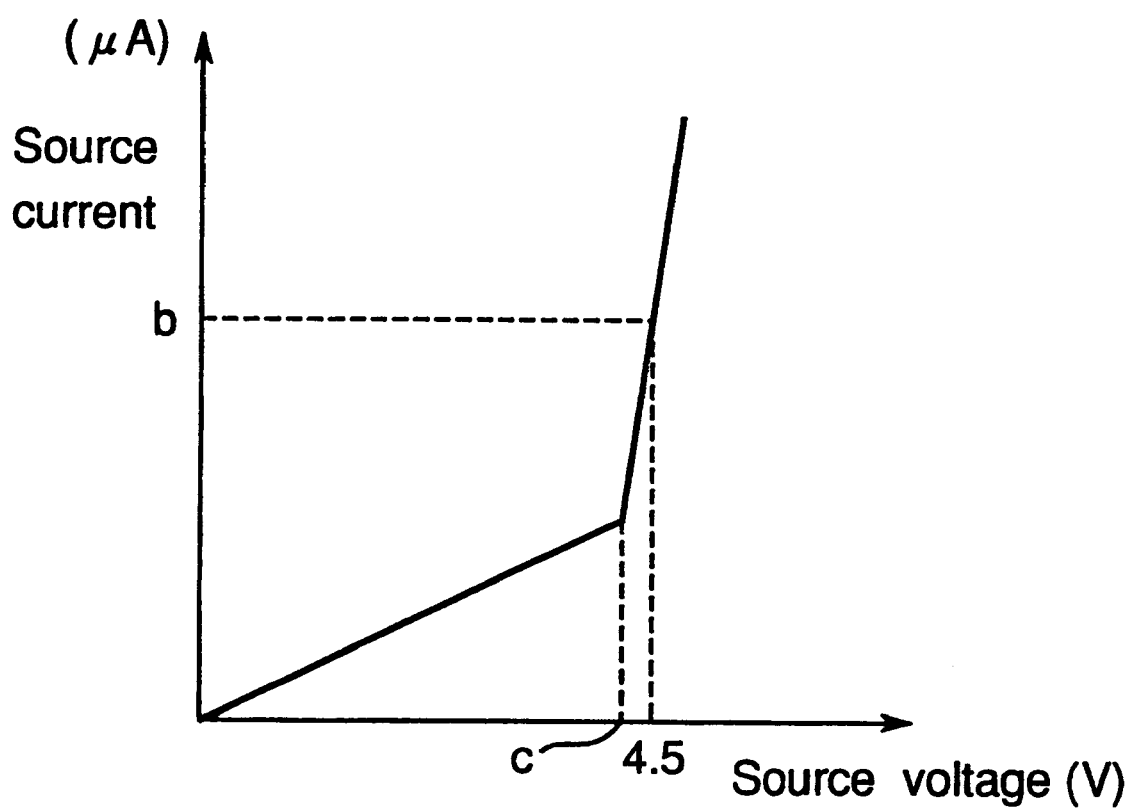
FIG. 5 is a graph illustrating the relationship between the source voltage and the source current output from the regulator circuit in FIG. 4.

FIG. 5 is a graph illustrating the relationship between the source voltage and the source current output from regulator circuit 21. As seen from FIG. 5, the source current rapidly increases when the source voltage exceeds a predetermined value c. This fact is caused by the fact that regulator 21 consumes the source current in order to keep its output voltage at a constant value c. The reference current b is set at a value corresponding to a voltage greater than the predetermined value c. For example, the predetermined value c for the source voltage is 4.2 V, and the voltage at the reference current b is 4.5 V.

Control circuit 8 sets the first and second error flags F1, F2 stored in register 12, depending on the judgment signal input from comparison circuit 23. For example, comparison circuit 23 outputs a judgment signal of LOW level into control circuit 8, if the source current input from regulator circuit 21 is equal to or greater than the reference current b. Control circuit 8 then resets both the first and second error flags stored in register 12. Control circuit 8 does not prohibit the writing of data into memory section 7 and performs predetermined processing following the commands input from host system apparatus 2, when both the first and second error flags F1, F2 are reset.

On the other hand, comparison circuit 23 outputs a judgment signal of HIGH level into control circuit 8, if the source current input from regulator circuit 21 is less than the reference current b. Control circuit 8 then sets the first error flag F1 stored in register 12, if the writing of data is not being performed. Control circuit 8 sets the second error flag F2 stored in register 12, if the writing of data is being performed. When either one of the first and second error flags F1, F2 is set, control circuit 8 prohibits the writing of data into memory section 7 and transmits a signal that indicates the writing of data is impossible, into host system apparatus 2 through UART 6, modulating circuit 4, and antenna 3. When the second error flag is set, in addition to the signal that indicates the writing of data is impossible, control circuit 8 may transmit a signal that indicates the writing of data has been incomplete, into host system apparatus 2.

In this way, control circuit 8 judges whether the writing of data into memory section 7 can be normally performed or not, based on the judgment signal input from comparison circuit 23. If judging that the writing of data cannot be normally performed, then control circuit 8 prohibits the writing of data into memory section 7 and informs host system apparatus 2 of the fact that the writing of data is impossible. A flowchart that illustrates the operation of IC card 25 during the writing of data is the same as FIG. 3, except the comparison circuit 11 is replaced with comparison circuit 23, so that it is omitted from here.

As described above, the non-contact type IC card of the second embodiment in accordance with the present invention monitors changes in the source current supplied from regulator circuit 21, due to changes in the electric field strength of the received radio waves. The IC card prohibits the writing of data into memory section 7 and transmits a signal that indicates the writing of data is impossible, into the host system apparatus 2, if the source current becomes less than the reference current b. Consequently, the IC card can prevent the writing of data from becoming incomplete caused by changes in the electric field strength of the received radio wave, so that the reliability of the writing of data can be improved.

THIRD EMBODIMENT.

In the first and second embodiments described above, if the source voltage declines during the time when data is written into memory section 7, then the writing of data is prohibited before it is completed. Therefore, at that time, the writing of data is terminated incompletely. Therefore, in the third embodiment described in the following, the IC card has an auxiliary power supply formed of a capacitor so that the writing of data should be completed, even if the source voltage declines so much as the writing cannot be continued during the time when data is written.

Figure 6:
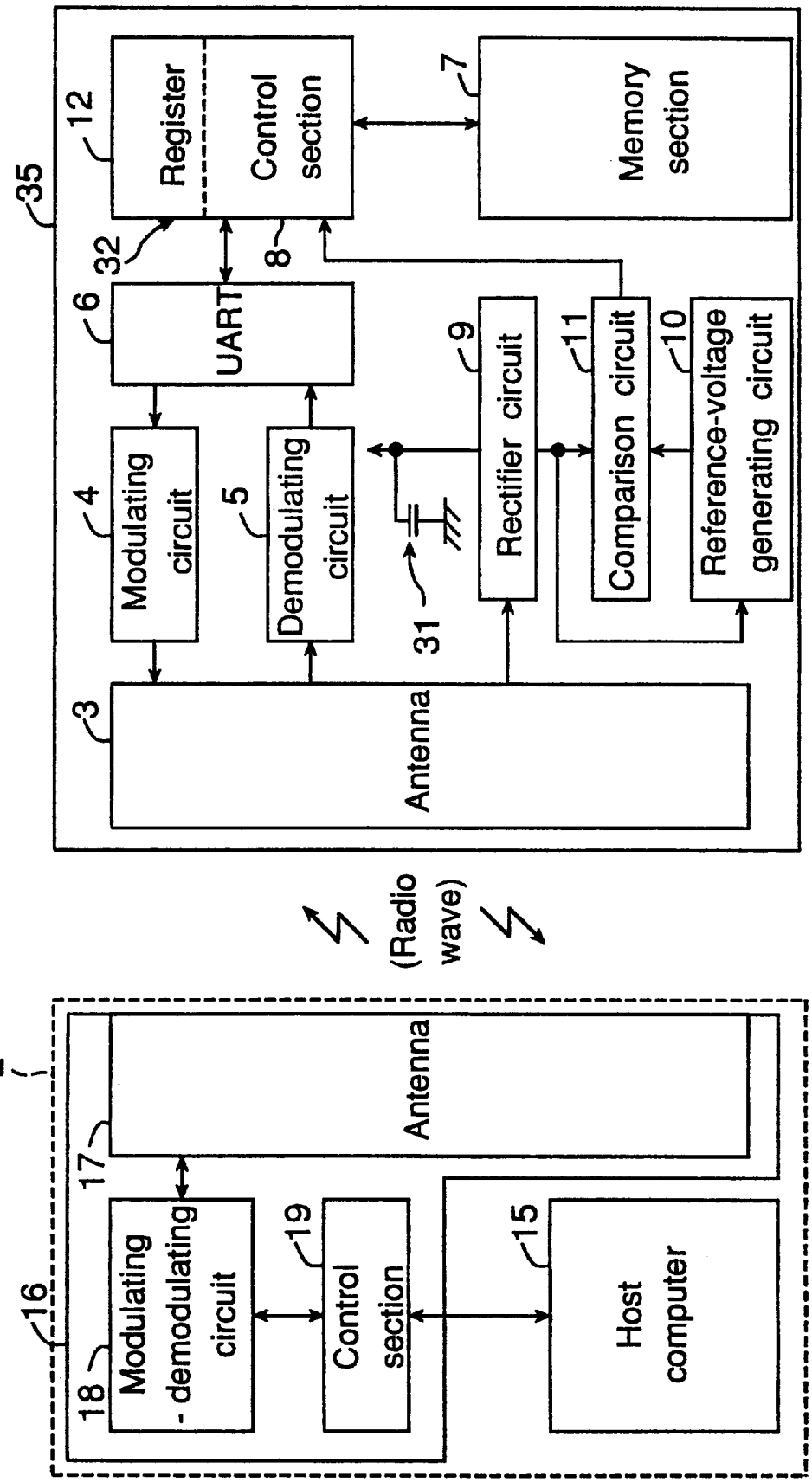
FIG. 6 is a block diagram illustrating a non-contact type IC card in a second embodiment.

FIG. 6 is a block diagram illustrating a non-contact type IC card in the third embodiment. FIG. 6 differs from FIG. 1 in that the IC card has additionally a capacitor 31. Also, if control circuit 8 receives a judgment signal of HIGH level from comparison circuit 11 because the source voltage input from rectifier circuit 9 becomes less than the reference voltage a during the writing of data, the control circuit 8 resets the second error flag F2 but does not prohibit the writing of data. The control circuit 8 and IC card 1 in FIG. 1 are now respectively changed into a control circuit 32 and an IC card 35 with these alterations.

Referring to FIG. 6, IC card 35 has a transmitting-and-receiving antenna 3, a modulating circuit 4, a demodulating circuit 5, a UART 6, and a memory section 7. IC card 35 further has a rectifier circuit 9, a reference-voltage generating circuit 10, a comparison circuit 11, a capacitor 31, and control circuit 32. Capacitor 31 functions as an auxiliary power supply. Control circuit 32 controls memory section 7. Control circuit 32 has a register 12, in which error flags are set depending on a signal output from comparison circuit 11. UART 6 is connected to control circuit 32. Control circuit 32 is connected to memory section 7. Comparison circuit 11 is connected to control circuit 32. Capacitor 31 is connected between the output of rectifier circuit 9 and the ground. Here, the output of rectifier circuit 9 is connected to modulating circuit 4, demodulating circuit 5, UART 6, memory section 7, and control circuit 32.

In the above construction, capacitor 31 is charged with the voltage output into modulating circuit 4, demodulating circuit 5, UART 6, memory section 7, and control circuit 32. Even if the electric field strength of a received radio wave declines, the voltage of the power output from rectifier circuit 9 into modulating circuit 4, demodulating circuit 5, UART 6, memory section 7, and control circuit 32 does not fall immediately owing to the electric charge in capacitor 31. Therefore, if the source voltage supplied from rectifier circuit 9 decreases during the writing of data so that the writing cannot be continued, then capacitor 31 functions as an auxiliary power supply, which supplies power to modulating circuit 4, demodulating circuit 5, UART 6, memory section 7, and control circuit 32. Capacitor 31 has a capacitance that can supply power for the completion of writing data.

Control circuit 32 sets the error flags stored in register 12, depending on the judgment signal input from comparison circuit 11. Register 12 stores a first error flag F1 and a second error flag F2. Control circuit 32 sets the first error flag F1 based on the judgment signal that is input from comparison circuit 11 when the writing of data is not performed. Control circuit 32 sets the second error flag F2 based on the judgment signal that is input from comparison circuit 11 when the writing of data is performed.

For example, comparison circuit 11 outputs a judgment signal of LOW level into control circuit 32, if the source voltage input from rectifier circuit 9 is equal to or greater than the reference voltage a. Control circuit 32 then resets both the first and second error flags F1, F2 stored in register 12. Control circuit 32 does not prohibit the writing of data into memory section 7 and performs predetermined processing following the commands input from host system apparatus 2, when both the first and second error flags F1, F2 are reset.

On the other hand, comparison circuit 11 outputs a judgment signal of HIGH level into control circuit 32, if the source voltage input from rectifier circuit 9 is less than the reference voltage a. Control circuit 32 then sets the first error flag F1 stored in register 12, if the writing of data is not being performed. Control circuit 32 sets the second error flag F2 stored in register 12, if the writing of data is being performed.

When the first error flags F1 is set, control circuit 32 prohibits the writing of data into memory section 7 and transmits a signal that indicates the writing of data is impossible, into host system apparatus 2 through UART 6, modulating circuit 4, and antenna 3. When the second error flag is set, control circuit 32 does not prohibit the writing of data into memory section 7 and transmits a signal that indicates the writing of data is impossible, into host system apparatus 2.

Figure 7:
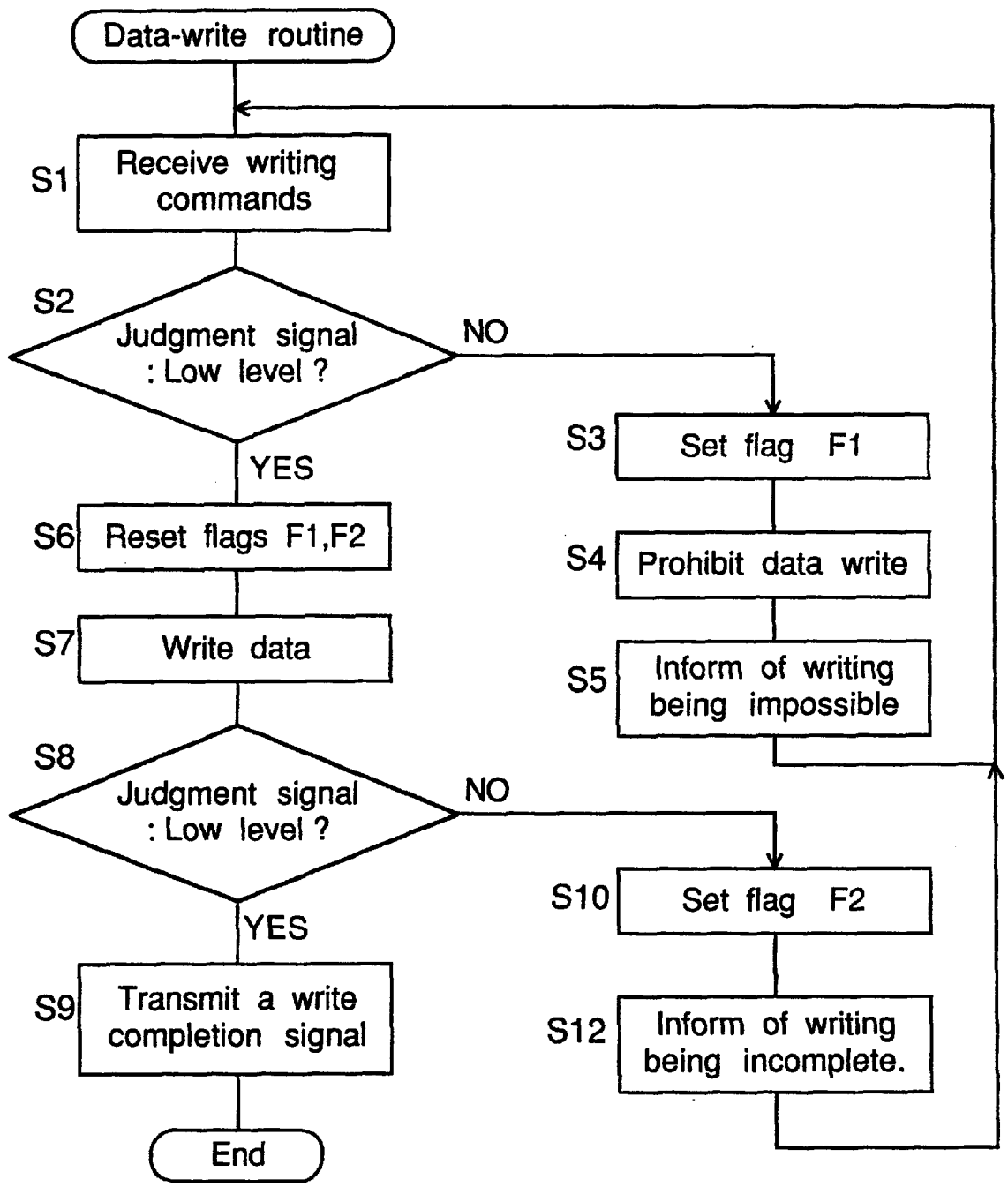
FIG. 7 is a flowchart illustrating the operation of the IC card in FIG. 6 during the writing of data.
Figure 8:
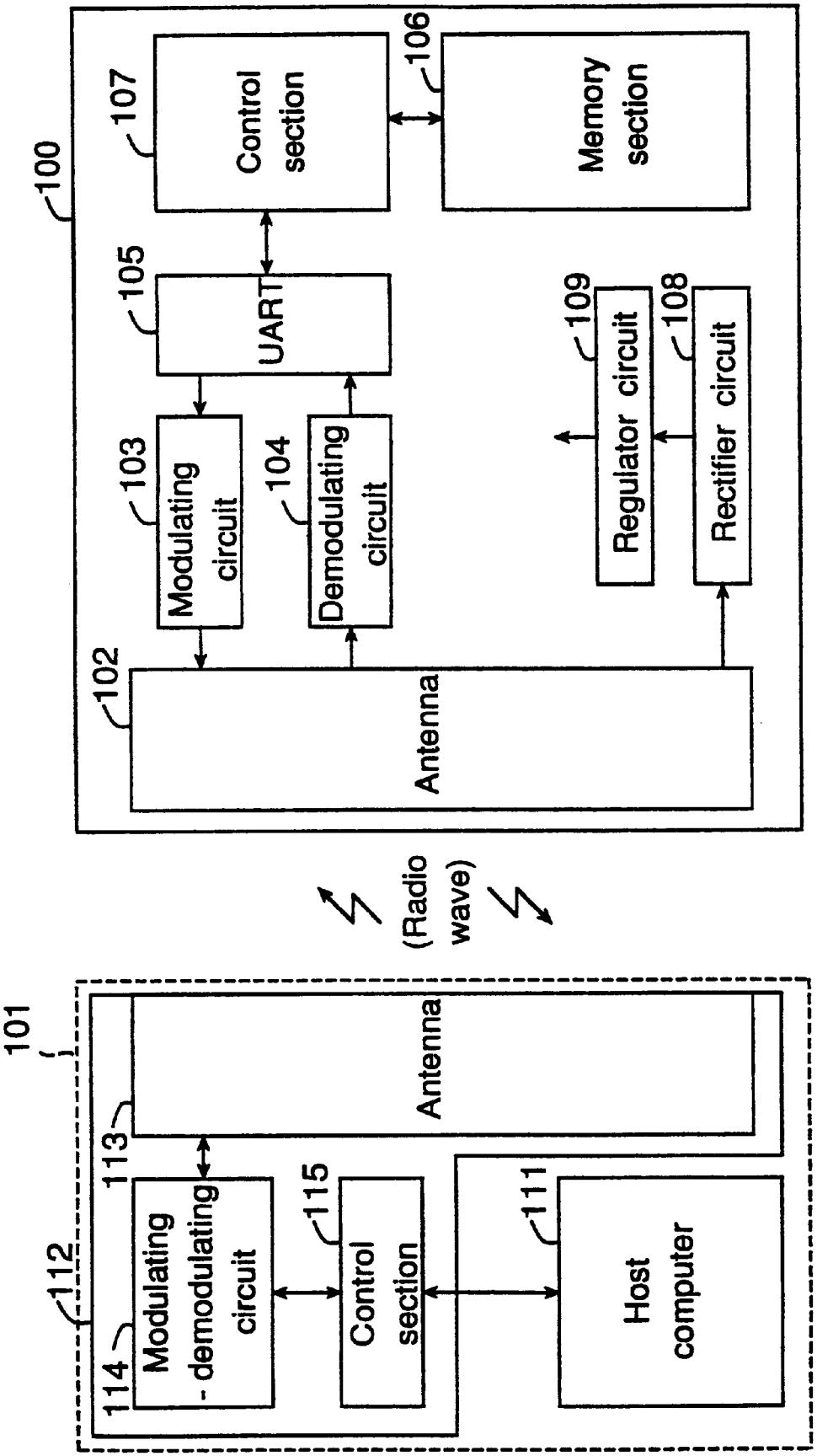
FIG. 8 is a block diagram illustrating a conventional non-contact type IC card.

FIG. 7 is a flowchart illustrating the operation of IC card 35 during the writing of data. The operation against changes in the electric field strength of the radio wave received by IC card 35 is described in the following in conjunction with FIG. 7.

In FIG. 7, the same processing as in FIG. 3, except the substitution of control circuit 32 for control circuit 8, is denoted by the same symbol and its description is omitted from the following. FIG. 7 differs from FIG. 3 in that step S11 is deleted, so that step S12 follows step S10.

In the third embodiment, the case where the IC card of the first embodiment is altered has been described. However, the IC card of the second embodiment can also be altered by adding the capacitor 31 and replacing the control circuit 8 with the control circuit 32. In this case, the capacitor 31 is connected between the output of the regulator circuit 21 and the ground. Here, the output of regulator circuit 21 is connected to modulating circuit 4, demodulating circuit 5, UART 6, memory section 7, and control circuit 32. The operations of capacitor 31 and control circuit 32 are the same as in the third embodiment, so that they are omitted from here.

As described above, the non-contact type IC card of the third embodiment in accordance with the present invention monitors changes in the source voltage supplied from rectifier circuit 9, due to changes in the electric field strength of the received radio waves. The IC card prohibits the writing of data into memory section 7 and transmits a signal that indicates the writing of data is impossible, into the host system apparatus 2, if the source voltage becomes less than the reference voltage a before the writing of data. The IC card transmits a signal that indicates the writing of data is impossible, into host system apparatus 2 and does not prohibit the writing of data into memory section 7. The IC card prevents the decline of the source voltage by means of capacitor 31 to make the writing to be completed. Consequently, the IC card can prevent the writing of data from being incomplete caused by changes in the electric field strength of the received radio wave, so that the reliability of the writing of data can be improved.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A non-contact IC card for transferring data to and from a host system apparatus through non-contact media including radio waves, said non-contact IC card comprising:

an interface section for interfacing with the host system apparatus;

a memory section for storing data;

a control circuit for controlling operation of said memory section, based on commands input from the host system apparatus through said interface section;

a rectifier circuit for rectifying a radio wave received by said interface section, to supply rectified power to each section as source power;

a reference-voltage generating circuit for generating and outputting a reference voltage; and a comparison circuit for comparing a voltage of the source power from said rectifier circuit with the reference voltage from said reference-voltage generating circuit, to output comparison results to said control circuit, wherein said control circuit has first and second flag means, said first flag means setting a first error flag when the source voltage is less than the reference voltage before writing of data and said second flag means setting a second error flag when the source voltage becomes less than the reference voltage during writing of data, and, when the first error flag is set, said control circuit prohibits writing of data into said memory section and transmits a signal that indicates writing of data into said memory section is impossible, to the host system apparatus, through said interface section, and, when the second flag is set, said control circuit prohibits writing of data into said memory section and transmits a signal that indicates writing of data into said memory section is incomplete, to the host system apparatus, through said interface section.

2. The non-contact IC card according to claim 1, wherein said rectifier circuit comprises an output and a capacitor coupled to the output, wherein when the source voltage becomes less than the reference voltage during the writing of data, said control circuit does not prohibit the writing of data into said memory section.

3. A non-contact IC card for transferring data to and from a host system apparatus through non-contact media including radio waves, said non-contact IC card comprising;

an interface section for interfering with a host system apparatus;

a memory section for storing data;

a control circuit for controlling operation of said memory section, based on commands input from the host system apparatus through said interface section;

a rectifier circuit for rectifying a radio wave received by said interface section to output rectified power;

a regulator circuit for maintaining a constant voltage of the power output from said rectifier circuit, to supply the regulated power as source power to said interface and memory sections;

a reference-current generating circuit for generating and outputting a reference current; and a comparison circuit for comparing a source current from said regulator circuit with the reference current from said reference-current generating circuit, to output comparison results to said control circuit, wherein said control circuit has first and second flag means, said first flag means setting a first error flag when the source current is less than the reference current before writing of data and said second flag means setting a second error flag when the source current becomes less than the reference current during writing of data, and, when the first error flag is set, said control circuit prohibits writing of data into said memory section and transmits a signal that indicates writing of data into said memory section is impossible, to the host system apparatus, through said interface section, and, when the second flag is set, said control circuit prohibits writing of data into said memory section and transmits a signal that indicates writing of data into said memory section is incomplete, to the host system apparatus, through said interface section.

4. The non-contact IC card according to claim 3 wherein said rectifier circuit comprises an output and a capacitor coupled to the output, wherein when the source current becomes less than the reference current during the writing of data, said control circuit does not prohibit the writing of data into said memory section.

* * * * *